(No Model.)
L. H. CONNER.
Shovel Plow.
No. 243,217. Patented June 21, 1881.
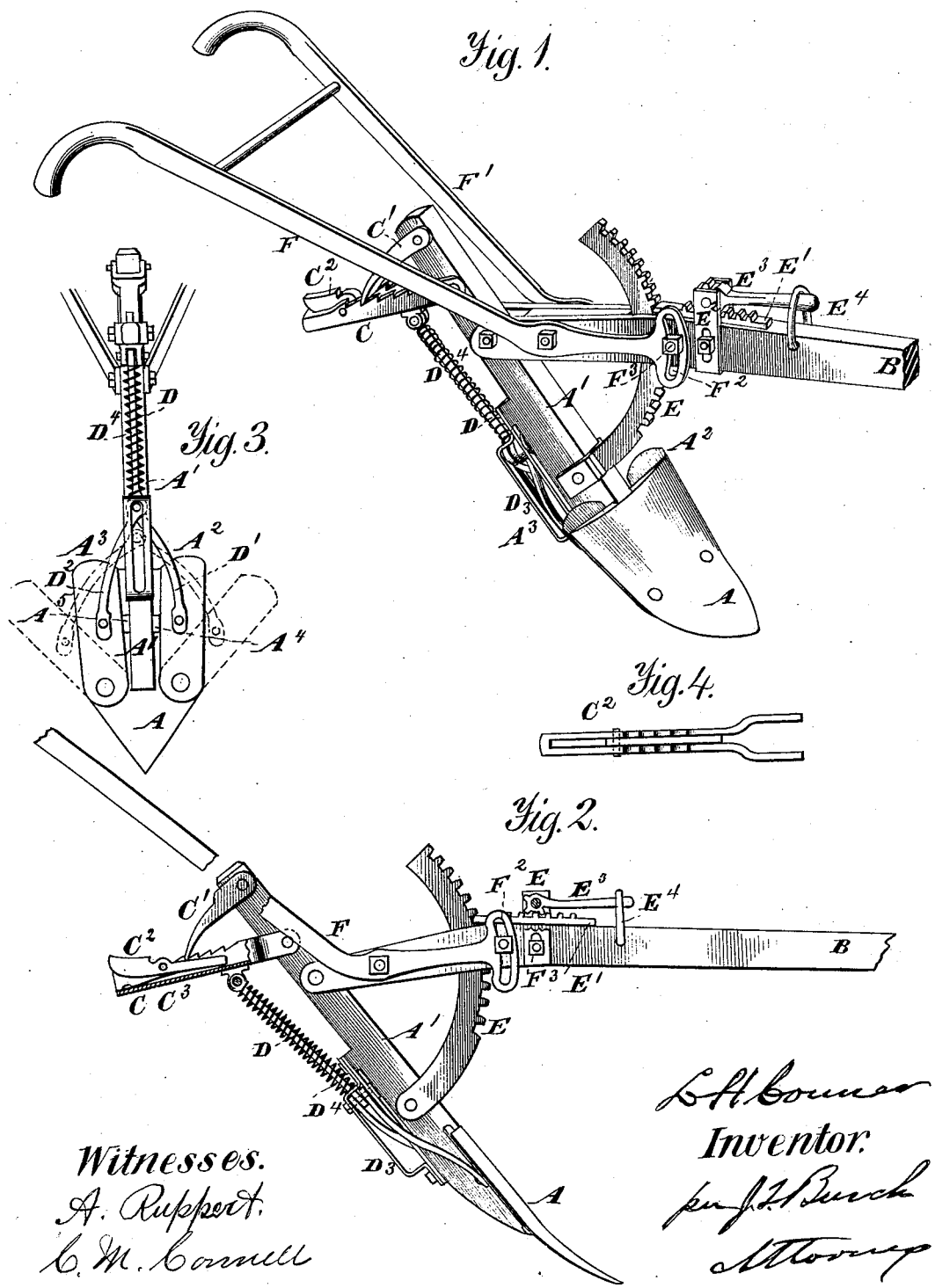

UNITED STATES PATENT OFFICE.

LAURANCE H. CONNER, OF GRAND VIEW, TEXAS.

SHOVEL-PLOW.

SPECIFICATION forming part of Letters Patent No. 243,217, dated June 21, 1881.

Application filed May 14, 1881. (No model.)

*To all whom it may concern:*

Be it known that I, LAURANCE H. CONNER, a citizen of the United States, residing at Grand View, in the county of Johnson and State of Texas, have invented certain new and useful Improvements in Shovel-Plows; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in shovel-plows and cultivators; and the objects of my improvements are, first, to provide a shovel for this class of implements having extensible wings pivoted to its rear surface, and combined with suitable mechanism by which they may be extended or forced inward while the cultivator is being used; second, to provide novel means of adjusting the angularity of the shovel and its standard with reference to the beam of the plow; third, to provide novel means for adjusting the positions of the outer ends of the handles; fourth, to provide the requisite mechanism for operating the expanding wings of the shovel; and, fifth, to provide the requisite combinations for producing the results hereinafter described. I accomplish these objects by the mechanism illustrated in the accompanying drawings, in which—

Figure 1 is a perspective view of a shovel-plow having my improvements embodied therein, it showing a portion of the beam, the adjustable handles, the shovel with wings attached to it for the purpose of rendering it capable of being widened at its upper end, the mechanism for operating said wings and for holding them in their adjusted positions, and also mechanism for changing the angularity of the shovel and its standard with reference to the beam. Fig. 2 is a side elevation, showing the mechanism above referred to. Fig. 3 is a rear-end view of the plow, showing the extension-wings in their closed positions in full lines and in their extended positions in dotted lines, and the spring and rods for operating the same; and Fig. 4 is a plan view of a notched lever which holds the wings in position.

Similar letters refer to similar parts throughout the several views.

It is well known that the space or distance between the rows of differing crops varies according to the character of the crop, and that in cultivating such crops it is desirable to move as much of the earth between them as is possible without causing the shovels to enter the earth to too great a depth, thereby leaving deep furrows for the water to enter or settle into.

In providing the necessary means for accomplishing this object I construct a shovel, A, of any desired form and dimensions, and secure it firmly to an adjustable standard, A'.

To the rear surface of the shovel A are pivoted two extensible wings, $A^2 A^3$, their pivotal points being so far above the point or lower end of the shovel as to cause their outer edges, when extended, to form a continuous line with the outer edges of the body of the shovel, so that in cultivating a crop the rows of which are a considerable distance apart a large portion of the surface of the earth between them may be moved and the weeds and other substances growing between them be rooted up without causing the shovel to enter the earth to such an extent as to form objectionably deep furrows between the rows. These wings and the shovel are, by preference, made of sheet-steel, but they may be of any other kind of metal, either cast or wrought.

In making provision for adjusting the angularity of the shovel and its standard with reference to the beam of the implement, and thus raising or depressing said beam to adapt it to be drawn by animals of different heights and at the same time regulate to some extent the depth that the shovel shall enter the earth, the standard A' is pivoted to the rear end of the beam B, said standard being provided with lugs or projections $A^4$ and $A^5$, so that the wings $A^2$ and $A^3$ when closed shall stand at a slight angle to the standard, as shown in Fig. 3, and thus be in a position to be opened outward by pressing down upon the lever C, which is pivoted to the standard A' at a point above where said standard is pivoted to the beam. This lever is provided upon its upper surface with a series of notches or teeth, which engage with a pawl, C', pivoted to the upper end of standard A'.

For enabling the operator to disengage the pawl from the teeth of the lever, the latter is provided with a slot in its center, as shown in Fig. 4, in which there is placed a dog, $C^2$, which is pressed upward by a spring, $C^3$. By pressing downward upon the outer end of this dog the pawl $C'$ will be lifted out of contact with the teeth of lever C, when, by pressing downward upon the outer end of said lever, the wings will be moved outward or into their opened positions, motion being communicated thereto by means of a rod, D, the upper end of which is pivoted to the lever, while its lower end is connected with the connecting-rods $D' D^2$, their lower ends being pivoted to the wings, as shown in Fig. 3.

For the purpose of holding the rods D and $D' D^2$ in the proper positions with reference to the standard $A'$ and the wings of the shovel, there is placed upon the rear surface of said standard a guide, $D^3$, which may consist of slotted bars, in which moves a pin having upon its inner end a head for preventing the rods from being thrown outward from the surface of the standard; or said guide may be of any other form that will perform the function required of it.

For holding the lever C in position when the wings have been adjusted for use under the circumstances existing at any particular time, a coiled spring, $D^4$, is placed upon the rod D in such a manner as to cause its lower end to rest upon the upper end of the guide $D^3$, and thus sustain the lever in its position, as shown in Figs. 1 and 2.

In making provision for changing the angularity of the shovel and its standard with reference to the beam of the implement, there is pivoted to said standard a curved bar, E, which passes up through a slot formed in the beam B, its outer edge being provided with cogs or teeth for the reception of the end of a sliding bar, $A'$, which is placed upon the upper side of the beam, and is held in position thereon by a yoke, $E^2$, which is bolted thereto. The upper surface of the sliding bar $E'$ is provided with cogs or teeth, which engage with the teeth formed on a partially-rotating lever, $E^3$, which has its bearings in the yoke $E^2$, said lever being held in position by a link, $E^4$. The arrangement of these last-named parts is such that upon withdrawing the end of the sliding bar $E'$ from its contact with the curved bar E the shovel A and its standard $A'$ may be made to assume a greater or less degree of angularity with reference to the beam of the implement, the effect of which will be to raise or lower said beam, and thus adapt it to animals of different heights, and allow the shovel to enter the earth to a greater or less extent. When the desired adjustment has been made the lever $E^3$ is turned into the position shown in Fig. 1 and the link placed over its outer end, by which means the parts will be held in their adjusted positions.

It is important that implements of this character should be provided with facilities for raising and lowering the outer ends of their handles, so as to adapt them to persons of different heights. In making such provision there are pivoted or bolted to the beam B at suitable points two handles, F $F'$, the forward ends of which are made of metal and the other portions of wood, or they may be entirely of metal, said forward ends being provided with sector-shaped slots $F^2$, through which passes a bolt, $F^3$. It will be seen that as a consequence of this construction and arrangement of the handles the outer or upper ends may be raised or lowered at any time, so as to make them convenient to any person, whatever his height may be, by simply unscrewing the nuts placed upon the bolts which secure the handles upon the beams and turning the handles into the desired position, when, by screwing up the nuts, the handles will be retained in their position until again adjusted.

Having thus described my invention, what I claim, and desire to secure by Letters Patent, is—

1. In a shovel-plow, the combination of an adjustable shovel-carrying standard, $A'$, a curved toothed bar, E, a sliding toothed bar, $E'$, a yoke, $E^2$, a toothed lever, $E^3$, and a beam, B, the parts being arranged for joint operation substantially as set forth, whereby the angularity of the shovel and its standard with reference to the beam can be regulated, for the purpose set forth.

2. The combination of the adjustable standard $A'$, the beam B, the pawl $C'$, the rods D, $D'$, and $D^2$, and the extensible wings $A^2$ and $A^3$, the parts being constructed and arranged for operation substantially as set forth, and for the purpose specified.

3. The combination of the standard $A'$, the guide $D^3$, the spring $D^4$, and the lever C, their arrangement being substantially such as shown and described, and for the purpose set forth.

In testimony whereof I affix my signature in presence of two witnesses.

LAURANCE H. CONNER.

Witnesses:
L. C. YOUNG,
GEO. F. GRAHAM.